(12) United States Patent
Carson et al.

(10) Patent No.: US 12,208,903 B2
(45) Date of Patent: Jan. 28, 2025

(54) HIGH COMFORT ENDURANCE HAPTIC CUSHION

(71) Applicant: Rockwell Collins, Inc., Cedar Rapids, IA (US)

(72) Inventors: Kassidy L. Carson, Colorado Springs, CO (US); John L. Hampton, Bradenton, FL (US); Glen Shaw, Colorado Springs, CO (US); Daniel R. Tribble, Colorado Springs, CO (US); Larry Parker, Colorado Springs, CO (US); Donald Borchelt, Monument, CO (US); John R. Skola, Rowlett, TX (US); James Donald Womack, Peyton, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 246 days.

(21) Appl. No.: 17/900,728

(22) Filed: Aug. 31, 2022

(65) Prior Publication Data

US 2024/0067343 A1 Feb. 29, 2024

(51) Int. Cl.
*B64D 11/06* (2006.01)
*B64D 45/00* (2006.01)

(52) U.S. Cl.
CPC .......... *B64D 11/0689* (2013.01); *B64D 45/00* (2013.01)

(58) Field of Classification Search
CPC ..... B64D 11/0689; B64D 45/00; B60N 2/976
USPC .................................................. 297/452.41
See application file for complete search history.

(56) References Cited

U.S. PATENT DOCUMENTS

| | | | | |
|---|---|---|---|---|
| 5,662,384 A | * | 9/1997 | O'Neill ................. | A47C 7/425 297/284.6 |
| 5,893,184 A | * | 4/1999 | Murphy ............... | A47C 27/148 297/284.6 |
| 6,014,784 A | | 1/2000 | Taylor et al. | |
| 6,744,370 B1 | | 6/2004 | Sleichter, III et al. | |
| 6,782,573 B2 | * | 8/2004 | Odderson ................ | B60N 2/62 297/284.6 |
| 8,339,285 B2 | | 12/2012 | Boren et al. | |
| 8,730,065 B2 | * | 5/2014 | Herman .................. | G08B 6/00 340/407.1 |
| 2020/0010197 A1 | | 1/2020 | Otovic | |
| 2021/0221259 A1 | | 7/2021 | Mizoi et al. | |

FOREIGN PATENT DOCUMENTS

| | | |
|---|---|---|
| EP | 1688118 | 8/2006 |
| WO | 2018168463 | 9/2018 |

OTHER PUBLICATIONS

United Kingdom Intellectual Property Office, United Kingdom Search Report dated Jan. 17, 2024 in Application No. 2313297.0.

* cited by examiner

*Primary Examiner* — Milton Nelson, Jr.
(74) *Attorney, Agent, or Firm* — SNELL & WILMER L.L.P.

(57) ABSTRACT

An endurance haptic system is disclosed herein. The endurance haptic system includes a plurality of tactors, a plurality of air bladders, a tactor driver operably coupled to the plurality of tactors and configured to send vibration commands to the plurality of tactors in response to a first signal received from an aircraft controller, and an air bladder driver operably coupled to the plurality of air bladders and configured to inflate and deflate the plurality of air bladders in response to a second signal received from the aircraft controller.

17 Claims, 6 Drawing Sheets

HIGH COMFORT ENDURANCE HAPTIC CUSHION

FIELD

The present disclosure generally relates aircraft seats, and more particularly, to endurance haptic for aircraft seats.

BACKGROUND

Aircraft typically include means for visually and auditorily communicating information and/or warnings to the aircrew. For example, the information may be conveyed to the aircrew via display monitors, indicator lights, head-up displays, helmet mounted displays, speakers, etc. During operations human comfort and fatigue can be a limiting factor in human piloted missions. Additionally, during operations, aircrew can become overwhelmed with visual and auditory information and may find it difficult to focus. Additionally, for visual communication the aircrew needs to be looking at the display to receive the information. In this regard, aircrew may not immediately see the information if he/she is looking externally or at other cockpit systems.

SUMMARY

An endurance haptic system is disclosed herein. The endurance haptic system includes a plurality of tactors, a plurality of air bladders, a tactor driver operably coupled to the plurality of tactors and configured to send vibration commands to the plurality of tactors in response to a first signal received from an aircraft controller, and an air bladder driver operably coupled to the plurality of air bladders and configured to inflate and deflate the plurality of air bladders in response to a second signal received from the aircraft controller.

In various embodiments, the endurance haptic further includes a seat cushion, wherein the plurality of air bladders includes a plurality of seat air bladders, the plurality of seat air bladders extending from a first edge of the seat cushion to an opposing second edge of the seat cushion, the plurality of seat air bladders being distributed along a length of the seat cushion. In various embodiments, the plurality of tactors includes a plurality of left seat tactors located in the seat cushion and a plurality of right seat tactors located in the seat cushion, the plurality of left seat tactors being located between a midplane of the seat cushion and the first edge of the seat cushion, and the plurality of right seat tactors being located between the midplane of the seat cushion and the second edge of the seat cushion. In various embodiments, the endurance haptic system further includes a plurality of reliefs formed in the plurality of seat air bladders, each of the plurality of reliefs configured to receive one of the plurality of left seat tactors or the plurality of right seat tactors, the plurality of reliefs disposed between the plurality of seat air bladders and a top surface of the seat cushion.

In various embodiments, the endurance haptic further includes a seatback cushion, wherein the plurality of air bladders includes a plurality of seatback air bladders, the plurality of seatback air bladders extending from a first edge of the seatback cushion to an opposing second edge of the seatback cushion, the plurality of seatback air bladders being distributed along a length of the seatback cushion. In various embodiments, the plurality of tactors further includes a plurality of left seatback tactors located in the seatback cushion and a plurality of right seatback tactors located in the seatback cushion, the plurality of left seatback tactors being located between a midplane of the seatback cushion and the first edge of the seatback cushion, and the plurality of right seatback tactors being located between the midplane of the seatback cushion and the second edge of the seatback cushion. In various embodiments, the endurance haptic system, further includes a plurality of reliefs formed in the plurality of seatback air bladders, each of the plurality of reliefs configured to receive one of the plurality of left seatback tactors or one of the plurality of right seatback tactors, the plurality of reliefs disposed between the plurality of seatback air bladders and a top surface of the seatback cushion.

Also disclosed herein is an endurance haptic cushion system including a plurality of tactors, a plurality of air bladders extending in alternating directions around each of the plurality of tactors, a tactor driver operably coupled to the plurality of tactors and configured to send vibration commands to the plurality of tactors in response to a first signal received from an aircraft controller, and an air bladder driver operably coupled to the plurality of air bladders and configured to inflate and deflate the plurality of air bladders in response to a second signal received from the aircraft controller.

In various embodiments, the endurance haptic cushion system further includes a seat cushion, wherein each of the plurality of air bladders extends from a first edge of the seat cushion to an opposing second edge of the seat cushion, the plurality of seat air bladders being distributed along a length of the seat cushion. In various embodiments, each of the plurality of haptics is disposed adjacent an air bladder of the plurality of air bladders. In various embodiments, the plurality of tactors includes a plurality of left seat tactors located in the seat cushion and a plurality of right seat tactors located in the seat cushion, the plurality of left seat tactors being located between a midplane of the seat cushion and the first edge of the seat cushion, and the plurality of right seat tactors being located between the midplane of the seat cushion and the second edge of the seat cushion.

In various embodiments, the cushion is a seatback cushion, wherein each of the plurality of air bladders extends from a first edge of the seatback cushion to an opposing second edge of the seatback cushion, the plurality of air bladders being distributed along a length of the seatback cushion. In various embodiments, each of the plurality of haptics is disposed adjacent an air bladder of the plurality of air bladders. In various embodiments, the plurality of tactors further includes a plurality of left seatback tactors located in the seatback cushion and a plurality of right seatback tactors located in the seatback cushion, the plurality of left seatback tactors being located between a midplane of the seatback cushion and the first edge of the seatback cushion, and the plurality of right seatback tactors being located between the midplane of the seatback cushion and the second edge of the seatback cushion.

Also disclosed herein is an endurance haptic cushion system including a plurality of air bladders, a plurality of tactors interspersed between the plurality of air bladders, a tactor driver operably coupled to the plurality of tactors and configured to send vibration commands to the plurality of tactors in response to a first signal received from an aircraft controller, and an air bladder driver operably coupled to the plurality of air bladders and configured to inflate and deflate the plurality of air bladders in response to a second signal received from the aircraft controller.

In various embodiments, the endurance haptic cushion system further includes a seat cushion, wherein each of the plurality of air bladders extends from a first edge of the seat cushion to an opposing second edge of the seat cushion, the plurality of seat air bladders being distributed along a length of the seat cushion. In various embodiments, each of the plurality of haptics is disposed adjacent an air bladder of the plurality of air bladders along the length of the seat cushion. In various embodiments, the plurality of tactors includes a plurality of left seat tactors located in the seat cushion and a plurality of right seat tactors located in the seat cushion, the plurality of left seat tactors being located between a midplane of the seat cushion and the first edge of the seat cushion, and the plurality of right seat tactors being located between the midplane of the seat cushion and the second edge of the seat cushion.

In various embodiments, the endurance haptic cushion system further includes a seatback cushion, wherein each of the plurality of air bladders extends from a first edge of the seatback cushion to an opposing second edge of the seatback cushion, the plurality of air bladders being distributed along a length of the seatback cushion. In various embodiments, each of the plurality of haptics is disposed adjacent an air bladder of the plurality of air bladders along the length of the seatback cushion, wherein the plurality of tactors further includes a plurality of left seatback tactors located in the seatback cushion and a plurality of right seatback tactors located in the seatback cushion, the plurality of left seatback tactors being located between a midplane of the seatback cushion and the first edge of the seatback cushion, and the plurality of right seatback tactors being located between the midplane of the seatback cushion and the second edge of the seatback cushion.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an endurance haptic system for use with aircraft seats, including ejection seats. In various embodiments, the endurance haptic system includes a seat cushion and a seatback cushion. The seat cushion includes a plurality of seat air bladders and a plurality of seat tactors. The seatback cushion includes a plurality of seatback air bladders and a plurality of seatback tactors. In various embodiments, the endurance haptic system includes a pump assembly that is operably connected to the plurality of seat air bladders and the plurality of seatback air bladders. In various embodiments, the endurance haptic system includes a controller that is operably connected to the pump assembly, the plurality of seat tactors, and the plurality of seatback tactors. In various embodiments, the controller and/or the pump assembly may be integral with either the seat cushion or the seatback cushion. While the discussion herein relates to ejection seats, it is understood that this disclosure may be generally applied to any domain employing seated-human piloted/occupied missions or endeavors, including, but not limited to, land, sea, air, and space applications using both endurance/comfort and alerting functions.

Figure 1:
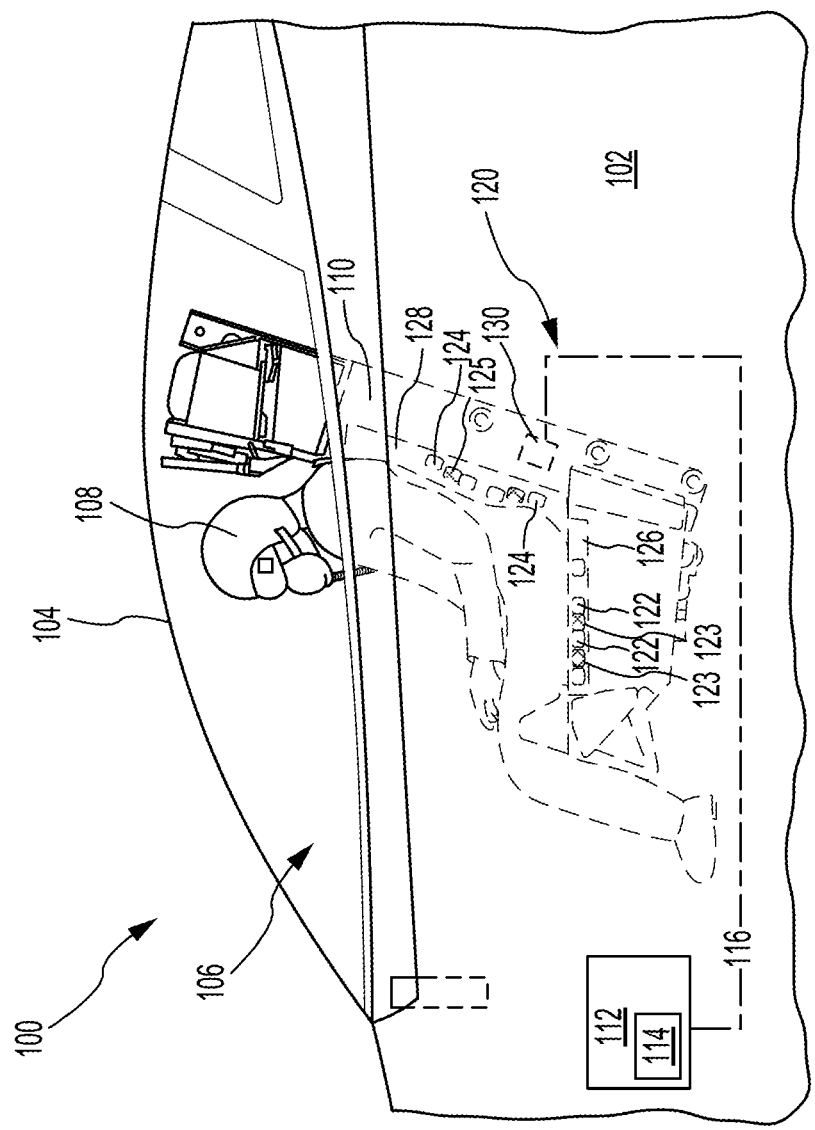
FIG. 1 illustrates an occupant seated on an ejection seat in a cockpit of an aircraft, in accordance with various embodiments.

Referring now to FIG. 1, an aircraft 100 is illustrated. In various embodiments, the aircraft 100 includes a fuselage 102 and a canopy 104 enclosing an internal cockpit 106 in which an occupant 108 (e.g., a pilot) is positioned while operating the aircraft 100. An ejection seat 110 is disposed within the cockpit 106. Ejection seat 110 is configured to accommodate the occupant 108 during operation of the aircraft 100 as well as during an ejection sequence, which may be initiated in response to an emergency, a malfunction of aircraft 100, or any other ejection event.

In accordance with various embodiments, an aircraft controller 112 is installed in aircraft 100. Aircraft controller 112 may comprise a network, computer-based system, and/or software components configured to provide an access point to various systems, engines, and components of aircraft 100. In various embodiments, aircraft controller 112 may be implemented as and may include one or more processors and/or one or more tangible, non-transitory memories capable of implementing logic in response to execution by the aircraft controller 112. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Aircraft controller 112 may comprise a processor configured to implement various logical operations in response to execution of instructions, for example, instructions stored on a non-transitory, tangible, computer-readable memory 114 configured to communicate with aircraft controller 112. Memory 114 may store instructions usable by the logic device(s) to perform operations and make determinations related to the control of (e.g., the signals 116 sent to) a endurance haptic system 120.

In accordance with various embodiments, endurance haptic system 120 may be installed on ejection seat 110. Endurance haptic system 120 includes seat tactors 122 located in a seat cushion 126 and/or seatback tactors 124 located in a seatback cushion 128 of ejection seat 110. Endurance haptic system 120 further includes seat air bladders 123 located in seat cushion 126 and/or seatback air bladders 125 located in seatback cushion 128. In accordance with various embodiments, the seat tactors 122 and seatback tactors 124 (collectively referred to as tactors 122, 124) may be energized by a controller 130 of endurance haptic system 120. In accordance with various embodiments, seat air bladders 123 and seatback air bladders 125 (collectively referred to as air bladders 123, 125) may be controlled by controller 130. The controller 130 is in communication, via wired or wireless connection, with aircraft controller 112. In accordance with various embodiments, controller 130 is configured to energize (e.g., send vibrate commands to) tactors 122, 124 in response to signals 116 received from aircraft controller 112. In accordance with various embodiments, controller 130 is further configured to control inflation and deflation of air bladders 123, 125 to reduce pilot fatigue, muscle cramping, and risk of blood clots, among others.

In accordance with various embodiments, the tactors 122, 124 may be energized individually, in groups, and/or collectively at varying frequencies, in varying order(s)/sequence(s), and/or at varying intervals (e.g., durations of time). In this regard, controller 130 is configured to determine which tactors 122, 124 to energize based on the signal(s) 116 received from aircraft controller 112. Vibration of tactors 122, 124 may be configured to alert occupant 108 of an impending danger or other situation of which the occupant 108 should be made aware. The location, strength, sequence, and/or duration of the vibrations can be configured to convey information to occupant 108 and/or to direct the attention of the occupant 108 in a particular direction. In various embodiments, controller 130 is configured to energize tactors 122, 124 to reduce pilot fatigue, muscle cramping, and risk of blood clots, among others, when in a non-tactical situation by varying location, strength, sequence, and/or duration of the vibrations of tactors 122, 124. In various embodiments, the strength of vibrations (e.g., the frequency of vibration) in a non-tactical situation may be weaker than the strength of vibration when in a tactical situation. In various embodiments, the duration of vibration in a non-tactical situation may be longer than the duration of vibration when in a tactical situation.

While endurance haptic system 120 is described with reference to an ejection seat 110, it is contemplated and understood that endurance haptic system 120 may be used with other types of crewmember seats, including for commercial aircraft. For example, endurance haptic system 120 may be installed on crewmember seats which do not eject from an aircraft (e.g., on pilot or copilot seats in commercial and/or private aircraft and/or on rotary or fixed wing aircraft). In various embodiments, tactors, similar to tactors 122, 124, and/or air bladders, similar to air bladders 123, 125, may be installed in a flight suit worn by occupant 108. In various embodiments, one or more of tactors 122 or tactors 124 may be located at the midplane 148 or midplane 158, respectively (as illustrated in FIG. 2).

Figure 2:
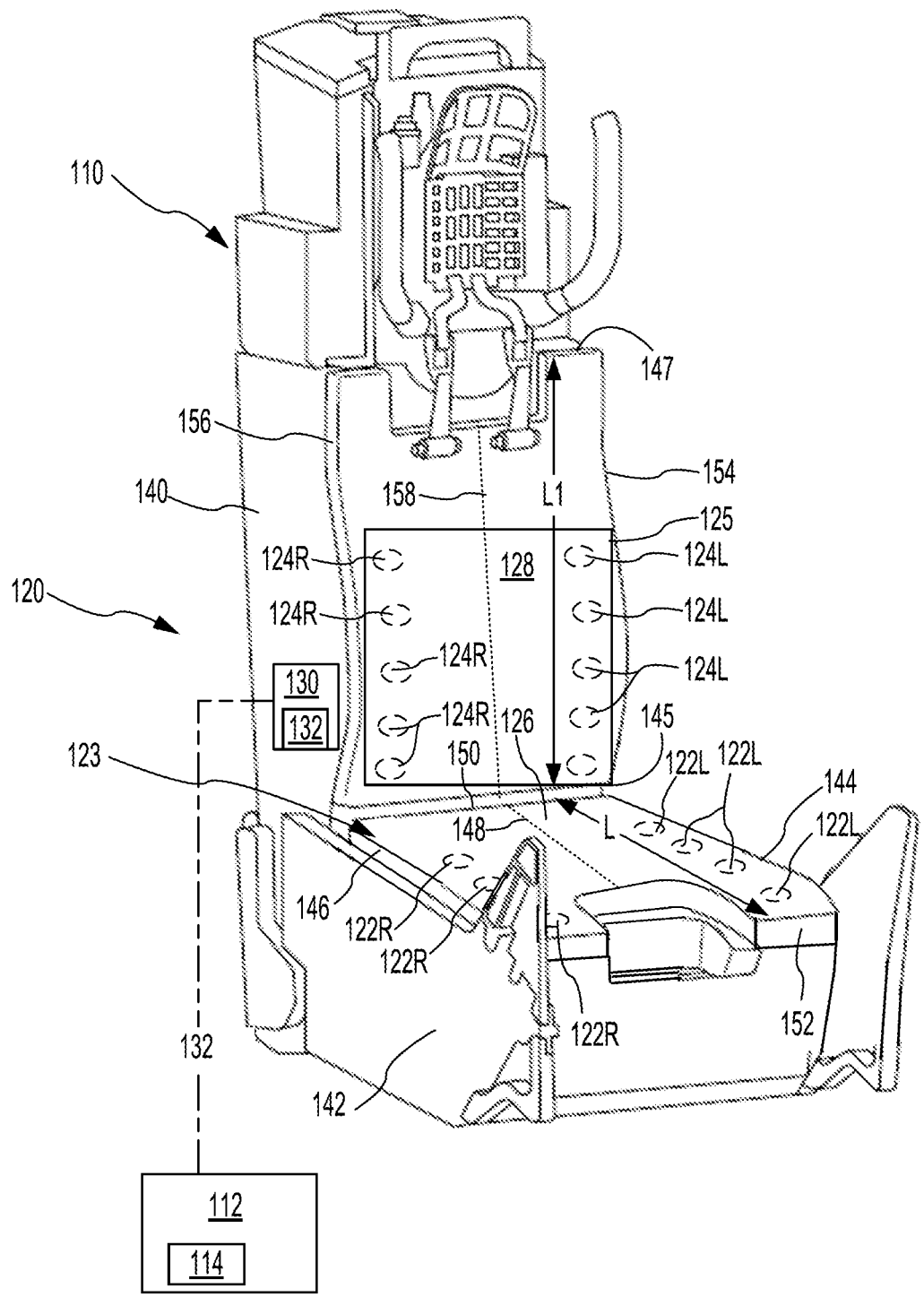
FIG. 2 illustrates an ejection seat including an endurance haptic system, in accordance with various embodiments.

With reference to FIG. 2, additional details of ejection seat 110 and endurance haptic system 120 are illustrated. In accordance with various embodiments, ejection seat 110 includes a seatback 140 and a seat bucket 142. Seat cushion 126 may be located over and/or on seat bucket 142. Seatback cushion 128 may be located over and/or on seatback 140. Seat tactors 122 may include a plurality of first (or left) seat tactors 122L located proximate a left side 144 of seat cushion 126, and a plurality of second (or right) seat tactors 122R located proximate a right side 146 of seat cushion 126. Left seat tactors 122L may be located between a midplane 148 of seat cushion 126 and left side 144 of seat cushion 126. Midplane 148 is an imaginary plane/line located halfway between left side 144 of seat cushion 126 and right side 146 of seat cushion 126 and extending from a backside 150 of seat cushion 126 to a frontside 152 of seat cushion 126. The backside 150 of seat cushion 126 is located proximate seatback 140. The frontside 152 of seat cushion 126 is opposite the backside 150 of the seat cushion 126 and seatback 140. Stated differently, the frontside 152 of the seat cushion 126 is distal to seatback 140. In various embodiments, left seat tactors 122L may be located halfway between the midplane 148 of seat cushion 126 and the left side 144 of seat cushion 126. In various embodiments, left seat tactors 122L may be located closer to the left side 144 of seat cushion 126 than to the midplane 148 of seat cushion 126. In various embodiments, right seat tactors 122R may be located halfway between the midplane 148 of seat cushion 126 and the right side 146 of seat cushion 126. In various embodiments, right seat tactors 122R may be located closer to the right side 146 of seat cushion 126 than to the midplane 148 of seat cushion 126.

In various embodiments, seat air bladders 123 may be located between seat tactors 122. In various embodiments, seat air bladders 123 may be located beneath seat tactors 122 such that seat tactors 122 are between a top portion of seat cushion 126 and seat air bladders 123. In various embodiments, seat air bladders 123 may include recesses in which seat tactors 122 are located. In various embodiments, seat air bladders 123 may zig-zig around tactors 122, such that seat air bladders 123 extend in alternating directions with each seat air bladder 123 changing direction to accommodate seat tactors 122.

Left seat tactors 122L may be arranged in a series (e.g., in a row) along left side 144 of seat cushion 126. Right seat tactors 122R may be arranged in a series (e.g., in a row) along right side 146 of seat cushion 126. In various embodiments, the left seat tactor 122L and the right seat tactor 122R closest to seatback 140 may be located at least 15%, at least 25%, and/or at least 33% of a length L of seat cushion 126 away from backside 150. Length L of seat cushion 126 may be measured between backside 150 of seat cushion 126 and the point on frontside 152 of seat cushion 126 that is farthest from backside 150. Stated differently, the left seat tactors 122L and the right seat tactors 122R may be located along 85%, 75%, and/or 67% of the length L of seat cushion 126, such that the area proximate backside 150 and seatback 140 is devoid of left seat tactors 122L and right seat tactors 122R.

Locating left seat tactors 122L and right seat tactors 122R proximate the left side 144 and the right side 146, respectively, of seat cushion 126 and away from backside 150 tends to increase occupant safety during ejection, as left seat tactors 122L and right seat tactors 122R are outboard of the spine, gluteal tuberosity, and pelvis bones, thereby reducing a likelihood that left seat tactors 122L and/or right seat tactors 122R will increase spinal loading during ejection. In this regard, the area proximate midplane 148, and in particular the area proximate midplane 148 and backside 150 of seat cushion 126 may be devoid of seat tactors 122.

Seatback tactors 124 may include a plurality of first (or left) seatback tactors 124L located proximate a left side 154 of seatback cushion 128, and a plurality of second (or right) seatback tactors 124R located proximate a right side 156 of seatback cushion 128. Left seatback tactors 124L may be located between a midplane 158 of seatback cushion 128 and left side 154 of seatback cushion 128. Midplane 158 is an imaginary plane/line located halfway between left side 154 of seatback cushion 128 and right side 156 of seatback cushion 128 and extending from a lower end 145 of seatback cushion 128 to an upper end 147 of seatback cushion 128. The lower end 145 of seatback cushion 128 is located proximate seat bucket 142. The upper end 147 of seatback cushion 128 is opposite the lower end 145 of the seatback cushion 128 and seat bucket 142. Stated differently, the upper end 147 of the seatback cushion 128 is distal to seat bucket 142. In various embodiments, left seatback tactors 124L may be located halfway between the midplane 158 of seatback cushion 128 and the left side 154 of seatback cushion 128. In various embodiments, left seatback tactors 124L may be located closer to the left side 154 of seatback cushion 128 than to the midplane 158 of seatback cushion 128. In various embodiments, right seatback tactors 124R may be located halfway between the midplane 158 of seatback cushion 128 and the right side 156 of seatback cushion 128. In various embodiments, right seatback tactors 124R may be located closer to the right side 156 of seatback cushion 128 than to the midplane 158 of seatback cushion 128.

In various embodiments, seatback air bladders 125 may be located between seatback tactors 124. In various embodiments, seatback air bladders 125 may be located beneath seatback tactors 124 such that seatback tactors 124 are between a top portion of seatback cushion 128 and seatback air bladders 125. In various embodiments, seatback air bladders 125 may include recesses in which seatback tactors 124 are located. In various embodiments, seatback air bladders 125 may zig-zig around seatback tactors 124, such that seatback air bladders 125 extend in alternating directions with each seatback air bladder 125 changing direction to accommodate seatback tactors 124.

Left seatback tactors 124L may be arranged in a series (e.g., in a row) along left side 154 of seatback cushion 128. Right seatback tactors 124R may be arranged in a series (e.g., in a row) along right side 156 of seatback cushion 128. In various embodiments, the left seat tactor 124L and the right seat tactor 124R that are closest to upper end 147 may be located at least 15%, at least 25%, at least 33%, or at least 50% of a length L1 of seatback cushion 128 away from upper end 147. Length L1 may be measured between lower end 145 and upper end 147. Stated differently, the left seatback tactors 124L and the right seatback tactors 124R may be located along 85%, 75%, 67%, or 50% of the length L1 of seatback cushion 128, such that the area proximate upper end 147 of seatback cushion 128 (e.g., the upper 15%, upper 25%, upper third and/or upper half of seatback cushion 128) is devoid of left seatback tactors 124L and right seatback tactors 124R.

Locating left seatback tactors 124L and right seatback tactors 124R only in the lower 85%, the lower 75%, the lower two thirds, or the lower half of seatback cushion 128 tends to increase the probability that the seat occupant's back will be in contact with, or in close proximity to, the portion of the seatback cushion 128 that includes the seatback tactors 124. For example, should the seat occupant be leaning forward and/or have his/her shoulders spaced apart from seatback cushion 128, the lower portion of the occupant's back will likely still be in contact with seatback cushion 128, or will, at least, be located close enough to seatback cushion 128 to feel the vibrations of the seatback tactors 124.

Figure 3A:
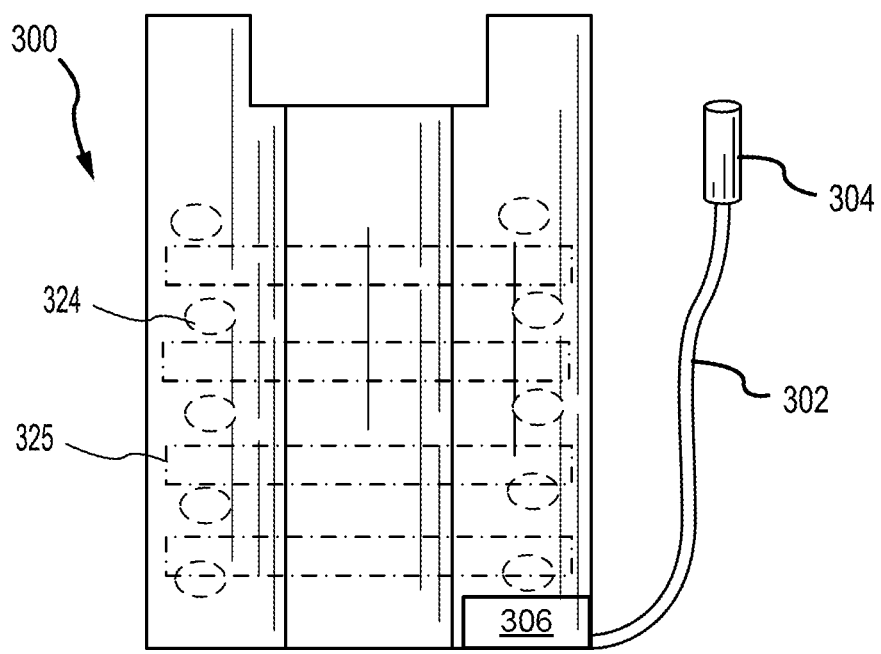
FIGS. 3A and 3B illustrate a seat cushion and a seatback cushion including an endurance haptic system, in accordance with various embodiments.
Figure 3B:
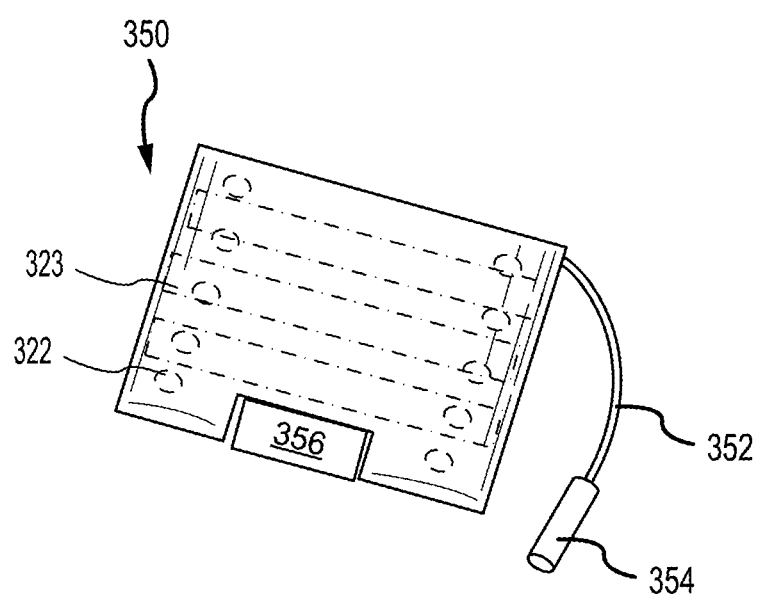

Referring now to FIGS. 3A and 3B, in accordance with various embodiments, perspective views of a seatback cushion 300 and a seat cushion 350 are illustrated. Seatback cushion 300 may be an example of seatback cushion 128 described above with respect to FIGS. 1 and 2. Seat cushion 350 may be an example of seat cushion 126 described above with respect to FIGS. 1 and 2.

Seatback cushion 300 includes a cable 302, a connector 304, a seatback controller 306, a plurality of seatback tactors 324, and a plurality of seatback air bladders 325. Controller 306 may be an example of controller 130 described above with respect to FIGS. 1 and 2. In various embodiments, connector 304 and cable 302 may connect to an aircraft (e.g., aircraft 100) to provide power to controller 306 and/or a signal path between controller 306 and an aircraft controller (e.g., aircraft controller 112). In various embodiments, controller 306 may further include a pump assembly for inflating and deflating seatback air bladders 325. In various embodiments, the pump assembly may be a discrete component. In various embodiments, controller 306 may not be integral with seatback cushion 300. In various embodiments, controller 306 may be located differently in seatback cushion 300.

Seat cushion 350 includes a cable 352, a connector 354, a seat controller 356, a plurality of seat tactors 322, and a plurality of seat air bladders 323. Controller 356 may be an example of controller 130 described above with respect to FIGS. 1 and 2. In various embodiments, connector 354 and cable 352 may connect to an aircraft (e.g., aircraft 100) to provide power to controller 356 and/or a signal path between controller 356 and an aircraft controller (e.g., aircraft controller 112). In various embodiments, controller 356 may further include a pump assembly for inflating and deflating seat air bladders 323. In various embodiments, the pump assembly may be a discrete component. In various embodiments, controller 356 may not be integral with seat cushion 350. In various embodiments, controller 356 may be located differently in seat cushion 350.

Figure 4A:
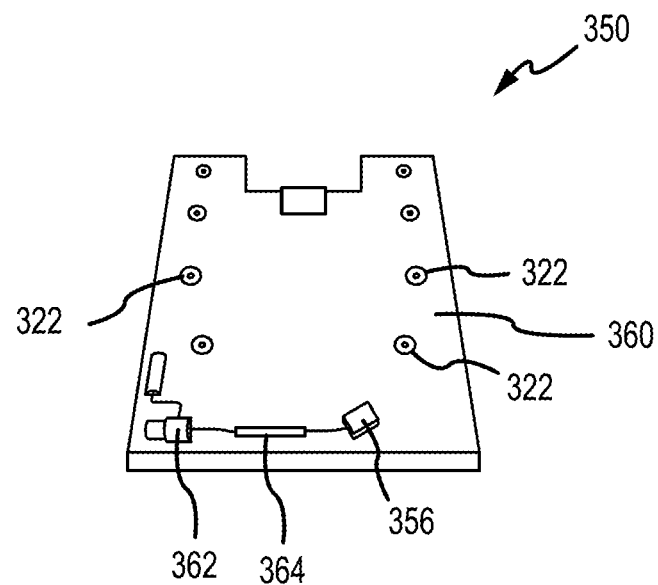
FIGS. 4A, 4B, and 4C illustrate a seat cushion including an endurance haptic system, in accordance with various embodiments.
Figure 4B:
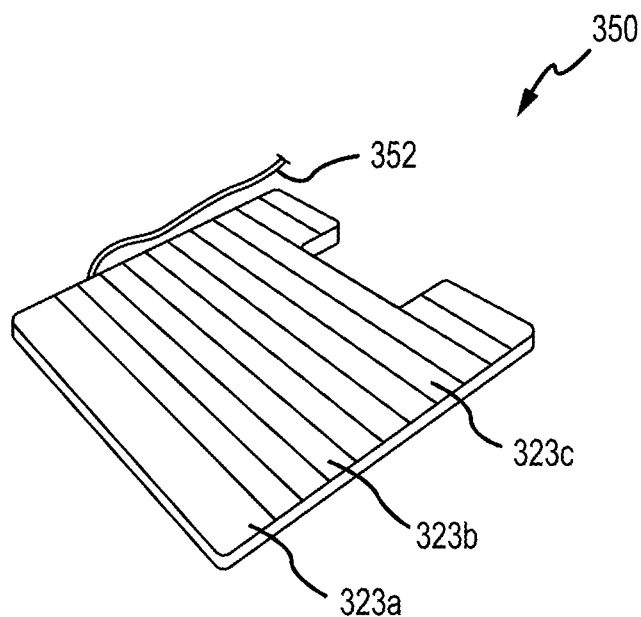
Figure 4C:
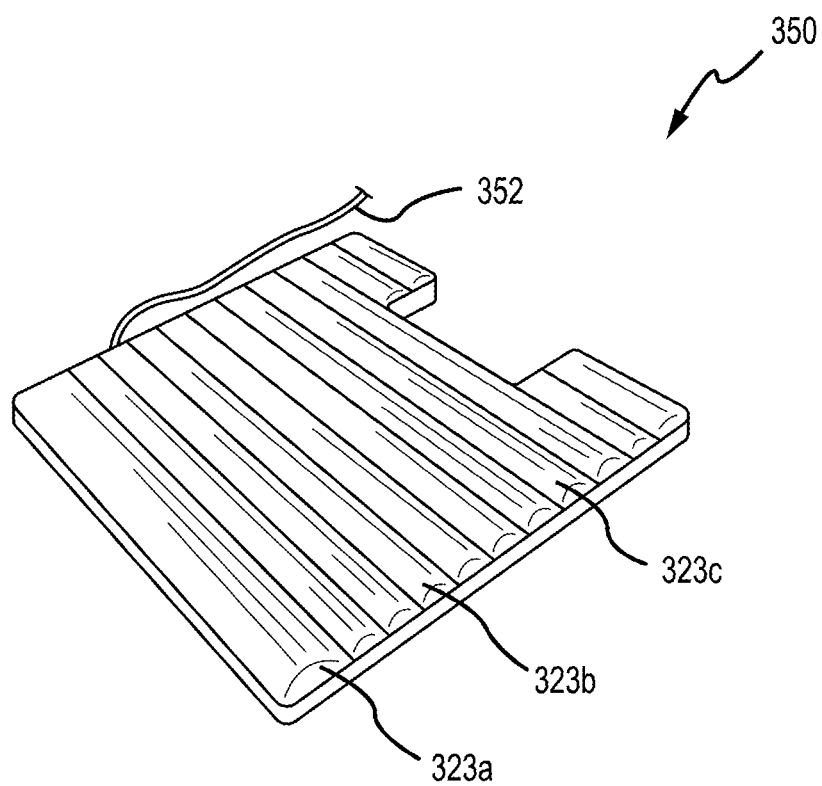

Referring now to FIGS. 4A-4C, in accordance with various embodiments, perspective views of seat cushion 350 are illustrated, which may be representative of seatback cushion 300. FIG. 4A illustrates an underside of the top portion 360 of seat cushion 350. A plurality of tactors 322 is located along the underside of top portion 360 of seat cushion 350, as described above with respect to FIGS. 1 and 2. A pump assembly 362 is illustrated, in accordance with various embodiments. In various embodiments, pump assembly 362 may include an integral manifold with one or more electro-mechanical devices (e.g., solenoid) to control airflow into and out of seat air bladders 323. In various embodiments, pump assembly 362 may include a separate, external manifold for controlling the airflow into and out of seat air bladders 323. In various embodiments, the one or more electro-mechanical devices (e.g., solenoid) may be located in the pump assembly 362 or in the external manifold. Pump assembly 362 may be coupled to controller 356 by wires 364. Controller 356 may send instructions to pump assembly 362 via wires 364. In various embodiments, pump assembly 362 and controller 356 may be located differently in seat cushion 350.

FIG. 4B illustrates seat air bladders 323 in a deflated state, including seat air bladders 323a, 323b, 323c. In various embodiments, each seat air bladder 323 (e.g., seat air bladders 323a, 323b, 323c) may be inflated and deflated individually. In various embodiments, all seat air bladder 323 (e.g., seat air bladders 323a, 323b, 323c) may be inflated and deflated collectively. Seat air bladders 323 may be placed over seat tactors 322 (as oriented in FIG. 4B), which may be under seat tactors 322 when seat cushion 350 is installed. In various embodiments, seat air bladders 323 may be arranged laterally (e.g., side to side) across seat cushion 350, as illustrated in FIG. 4B. In various embodiments, seat air bladders 323 may be arranged longitudinally (e.g., front to back) across seat cushion 350. In various embodiments, seat air bladders 323 may be arranged in other configurations, including randomly, within seat cushion 350.

FIG. 4C illustrates seat air bladders 323 in an inflated state. As illustrated, every seat air bladder 323 (e.g., seat air bladder 323a, 323b, 323c) is inflated. However, in various embodiments, seat air bladders 323 may be inflated individually.

Figure 5:
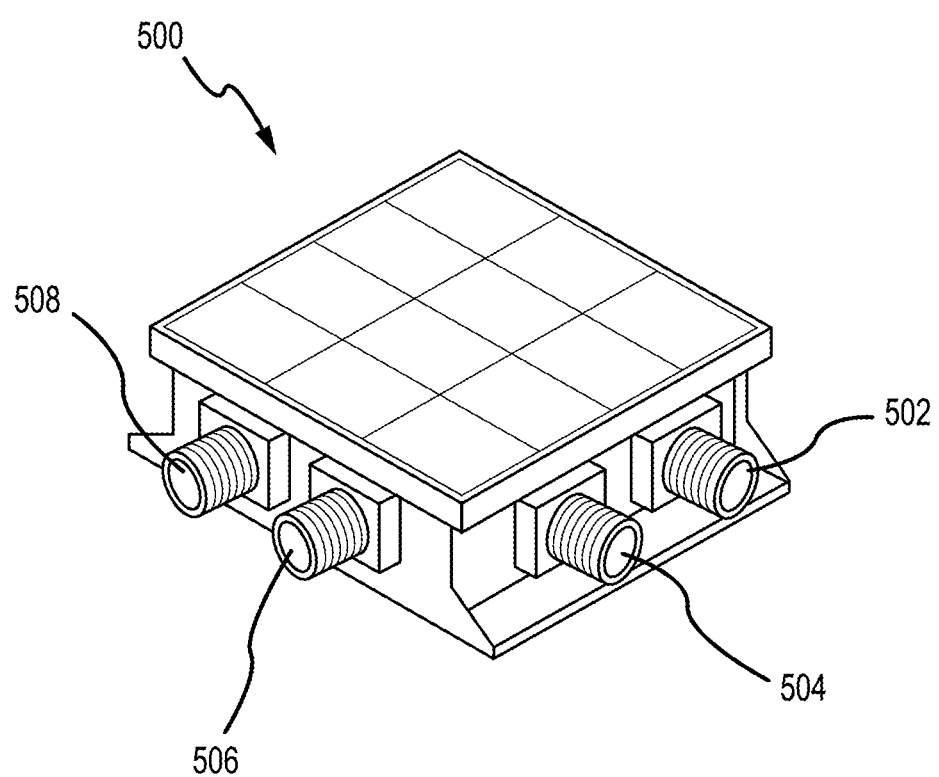
FIG. 5 illustrates an electronic control module for use with an endurance haptic system, in accordance with various embodiments.

Referring now to FIG. 5, in accordance with various embodiments, a control module housing 500 is illustrated. Control module housing 500 may house a controller (e.g., controller 306, controller 356) for controlling seat cushion 350 and/or seatback cushion 300. In various embodiments, control module housing 500 may be integral with seat cushion 350 and/or seatback cushion 300. In various embodiments, control module housing 500 may further include a pump assembly (e.g., pump assembly 362). Control module housing 500 includes a seatback cushion power/signal connector 502, a seat cushion power/signal connector 504, an aircraft power connector 506, and an aircraft signal connector 508. Seatback cushion power/signal connector 502 may interface with connector 304. Seat cushion power/signal connector 504 may interface with connector 354. Aircraft power connector 506 may interface with a power source in aircraft 100. Aircraft signal connector 508 may interface with aircraft controller 112. In various embodiments, control module housing 500 may be designed for quick release in the event of an emergency, such as an ejection event. In various embodiments, control module housing 500 connectors may be electrical connectors, pneumatic connectors, and/or a combination of electrical and pneumatic connectors. In various embodiments, the electrical and/or pneumatic connections may be severed by a cutting blade (e.g., a guillotine) that renders the devices inoperable or otherwise neutral and safe for ejection.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An endurance haptic system, comprising:
   a plurality of tactors;
   a plurality of air bladders;
   a tactor driver operably coupled to the plurality of tactors and configured to send vibration commands to the plurality of tactors in response to a first signal received from an aircraft controller;
   an air bladder driver operably coupled to the plurality of air bladders and configured to inflate and deflate the plurality of air bladders in response to a second signal received from the aircraft controller; and
   a seat cushion, wherein the plurality of air bladders includes a plurality of seat air bladders, the plurality of seat air bladders extending from a first edge of the seat cushion to an opposing second edge of the seat cushion, the plurality of seat air bladders being distributed along a length of the seat cushion.

2. The endurance haptic system of claim 1, wherein the plurality of tactors includes a plurality of left seat tactors located in the seat cushion and a plurality of right seat tactors located in the seat cushion, the plurality of left seat tactors being located between a midplane of the seat cushion and the first edge of the seat cushion, and the plurality of right seat tactors being located between the midplane of the seat cushion and a second edge of the seat cushion.

3. The endurance haptic system of claim 2, further comprising:
   a plurality of reliefs formed in the plurality of seat air bladders, each of the plurality of reliefs configured to receive one of the plurality of left seat tactors or the plurality of right seat tactors, the plurality of reliefs disposed between the plurality of seat air bladders and a top surface of the seat cushion.

4. The endurance haptic system of claim 1, further comprising:
   a seatback cushion, wherein the plurality of air bladders includes a plurality of seatback air bladders, the plurality of seatback air bladders extending from a first edge of the seatback cushion to an opposing second edge of the seatback cushion, the plurality of seatback air bladders being distributed along a length of the seatback cushion.

5. The endurance haptic system of claim 4, further comprising:
   a plurality of reliefs formed in the plurality of seatback air bladders, each of the plurality of reliefs configured to receive one of a plurality of left seatback tactors or one of a plurality of right seatback tactors, the plurality of reliefs disposed between the plurality of seatback air bladders and a top surface of the seatback cushion.

6. The endurance haptic system of claim 4, wherein the plurality of tactors further includes a plurality of left seatback tactors located in the seatback cushion and a plurality of right seatback tactors located in the seatback cushion, the plurality of left seatback tactors being located between a midplane of the seatback cushion and the first edge of the seatback cushion, and the plurality of right seatback tactors being located between the midplane of the seatback cushion and a second edge of the seatback cushion.

7. An endurance haptic system, comprising:
   a plurality of tactors;
   a plurality of air bladders extending in alternating directions around each of the plurality of tactors;
   a tactor driver operably coupled to the plurality of tactors and configured to send vibration commands to the plurality of tactors in response to a first signal received from an aircraft controller;
   an air bladder driver operably coupled to the plurality of air bladders and configured to inflate and deflate the plurality of air bladders in response to a second signal received from the aircraft controller; and
   a seat cushion, wherein each of the plurality of air bladders extends from a first edge of the seat cushion to an opposing second edge of the seat cushion, a plurality of seat air bladders being distributed along a length of the seat cushion.

8. The endurance haptic cushion system of claim 7, wherein each of the plurality of tactors is disposed adjacent an air bladder of the plurality of air bladders.

9. The endurance haptic cushion system of claim 8, wherein the plurality of tactors includes a plurality of left seat tactors located in the seat cushion and a plurality of right seat tactors located in the seat cushion, the plurality of left seat tactors being located between a midplane of the seat cushion and the first edge of the seat cushion, and the plurality of right seat tactors being located between the midplane of the seat cushion and a second edge of the seat cushion.

10. The endurance haptic cushion system of claim 7, wherein the seat cushion is a seatback cushion, wherein each of the plurality of air bladders extends from a first edge of the seatback cushion to an opposing second edge of the seatback cushion, the plurality of air bladders being distributed along a length of the seatback cushion.

11. The endurance haptic cushion system of claim 10, wherein each of the plurality of tactors is disposed adjacent an air bladder of the plurality of air bladders.

12. The endurance haptic cushion system of claim 11, wherein the plurality of tactors further includes a plurality of left seatback tactors located in the seatback cushion and a plurality of right seatback tactors located in the seatback cushion, the plurality of left seatback tactors being located between a midplane of the seatback cushion and the first edge of the seatback cushion, and the plurality of right seatback tactors being located between the midplane of the seatback cushion and a second edge of the seatback cushion.

13. An endurance haptic cushion system, comprising:
   a plurality of air bladders;
   a plurality of tactors interspersed between the plurality of air bladders;
   a tactor driver operably coupled to a plurality of tactors and configured to send vibration commands to the plurality of tactors in response to a first signal received from an aircraft controller;
   an air bladder driver operably coupled to the plurality of air bladders and configured to inflate and deflate the plurality of air bladders in response to a second signal received from the aircraft controller; and
   a seat cushion, wherein each of the plurality of air bladders extends from a first edge of the seat cushion to an opposing second edge of the seat cushion, a plurality of seat air bladders being distributed along a length of the seat cushion.

14. The endurance haptic cushion system of claim 13, wherein each of the plurality of tactors is disposed adjacent an air bladder of the plurality of air bladders along the length of the seat cushion.

15. The endurance haptic cushion system of claim 14, wherein the plurality of tactors includes a plurality of left seat tactors located in the seat cushion and a plurality of right seat tactors located in the seat cushion, the plurality of left seat tactors being located between a midplane of the seat cushion and the first edge of the seat cushion, and the plurality of right seat tactors being located between the midplane of the seat cushion and a second edge of the seat cushion.

16. The endurance haptic cushion system of claim 13, further comprising a seatback cushion, wherein each of the plurality of air bladders extends from a first edge of the seatback cushion to an opposing second edge of the seatback cushion, the plurality of air bladders being distributed along a length of the seatback cushion.

17. The endurance haptic cushion system of claim 16, wherein each of the plurality of tactors is disposed adjacent an air bladder of the plurality of air bladders along the length of the seatback cushion, wherein the plurality of tactors further includes a plurality of left seatback tactors located in the seatback cushion and a plurality of right seatback tactors located in the seatback cushion, the plurality of left seatback tactors being located between a midplane of the seatback cushion and the first edge of the seatback cushion, and the plurality of right seatback tactors being located between the midplane of the seatback cushion and a second edge of the seatback cushion.

\* \* \* \* \*